United States Patent [19]

Pucknat et al.

[11] Patent Number: 5,395,877
[45] Date of Patent: Mar. 7, 1995

[54] PROCESS FOR THE PRODUCTION OF STABLE HIGH WAX CONTENT VINYL LATICES

[75] Inventors: John G. Pucknat, New York, N.Y.; Christina C. Su, Hawthorne, N.J.

[73] Assignee: Sun Chemical Corporation, Fort Lee, N.J.

[21] Appl. No.: 169,940

[22] Filed: Dec. 20, 1993

[51] Int. Cl.$^6$ .......................... C08F 2/00; C08K 5/00; C08L 91/00
[52] U.S. Cl. .................................. 524/460; 524/458; 524/700; 524/763
[58] Field of Search ................ 524/460, 763, 700, 458

[56] References Cited

U.S. PATENT DOCUMENTS

| | | | |
|---|---|---|---|
| 4,151,143 | 4/1979 | Blank et al. | 260/29.6 RW |
| 4,293,471 | 10/1981 | Heiberger | 260/22 CB |
| 4,569,896 | 2/1986 | Perez et al. | 430/106.6 |
| 4,659,641 | 4/1987 | Mahalek et al. | 524/763 X |
| 4,820,762 | 4/1989 | Tsaur | 524/460 |
| 4,873,281 | 10/1989 | Maska | 524/763 X |
| 5,028,265 | 7/1991 | Thuemmes et al. | 106/271 |
| 5,034,454 | 7/1991 | Maska et al. | 524/763 |

FOREIGN PATENT DOCUMENTS 59-191706  4/1983  Japan .

*Primary Examiner*—Judy M. Reddick
*Attorney, Agent, or Firm*—Jack Matalon

[57] ABSTRACT

Stable, compatible, resin fortified aqueous vinyl polymer emulsions that are rich in wax are prepared in a method comprising a first polymerization of a mixture containing wax and monomers that include carboxylated monomers such as acrylic acid. The first polymerization or terpolymerization is carried out under conditions sufficient to produce a relatively low molecular weight resin. A portion of the wax rich resin from the first polymerization is neutralized and used as a cosurfactant in a second aqueous emulsion polymerization of vinyl monomers to produce a fortified vinyl latex that is rich in wax. Coatings prepared from the latex exhibit superior moisture barrier properties and are also useful as surface preservatives.

5 Claims, No Drawings

PROCESS FOR THE PRODUCTION OF STABLE HIGH WAX CONTENT VINYL LATICES

FIELD OF THE INVENTION

This invention relates to a novel process for production of stable aqueous emulsions of vinyl polymers, herein referred to as vinyl latices, that are rich in paraffinic wax and fortified with low molecular weight, carboxylated resins. The vinyl latices are prepared by addition polymerization of vinyl monomers in an aqueous emulsion mixture containing the aqueous reaction product of the addition polymerization of a mixture of monomers which also contain a carboxylated vinyl monomer and a substantial quantity of paraffinic wax. The resultant paraffin-rich, resin-fortified vinyl latices are useful for the preparation of coatings having especially low moisture permeability.

BACKGROUND OF THE INVENTION

The free radical initiated polymerization of vinyl monomers in aqueous emulsions is a process well known in the polymer field and described in such classic references as "Emulsion Polymerization" by F. A. Bovey, et al., Interscience Publishers, N.Y., 1955 and in the Encyclopedia of Polymer Science and Technology. The vinyl latices are prepared by suspending one or more monomers in water in contact with a surfactant and a free radical initiator such as ammonium persulfate. Surfactants commonly employed include ethoxylated polypropylene glycol, ethoxylated nonyl phenol, etc. Mixtures of various surfactants can be employed including the ammonium or alkali salts of low molecular weight polymers containing carboxy groups. The use of such low molecular weight carboxylated polymers as cosurfactant typically leads to the characterization of the resultant polymer vinyl latex as a fortified or resin-fortified latex.

Artisans engaged in the development of inks and surface coatings derived from polymer latices are continually challenged by the need to modify the latex formulations to enhance properties required for the end-user application. Of these modifications, the inclusion of wax in the latex formulation is commonly employed and is well known in the art. Wax, it has been found, functions well as a component of a vinyl latex to provide key properties in the coating produced therefrom. As will be described in more detail hereinafter, a wide variety of waxes can be and have been included in vinyl latex. These waxes, generally added in low concentrations to the vinyl latex, provide coatings with improved mar resistance, anti-blocking properties, slip and formability improvement, anti-settling, coating flatting, abrasion resistance and metal marking resistance.

As practiced in the art heretofore, waxes are added to the latex polymerization reaction mixture just before, during, or after the emulsification polymerization step. A major problem found within the latices prepared by this technique is a propensity for the wax to separate from the emulsion mixture, or otherwise cause the emulsion to break. Separation can occur as a function of the work preformed during application, during post-treatment of the coating formed in the application, as a result of ambient temperature swings or progressive chemical incompatibility. For whatever cause, the emulsion instability and resultant wax separation destroys the utility of the latex product. The problem of emulsion stability becomes particularly aggravated when higher concentrations of wax are required in the emulsion in order to confer a particularly desirable property on the resultant coating. The higher the wax loading, the more difficult it is to prepare a stable emulsion.

One of the more desirable coating properties sought after in the field of inks and synthetic surface coatings is moisture impermeability. It is highly advantageous for coatings such as those used on food and detergent containers to be very resistant to, if not impermeable to, moisture. One way to produce such moisture impermeability in vinyl latex derived coatings is to include relatively high loadings or concentrations of wax in the latex. However, a wax concentration high enough to render the subsequent coating a moisture barrier intrudes into the zone of those latex/wax mixtures that comprise highly unstable emulsions. Accordingly, workers in the field are critically challenged by the need to discover a means to prepare vinyl latices that are both stable as formulated but also contain high concentrations of wax so that coatings can be produced having improved moisture barrier qualities.

U.S. Pat. No. 4,151,143 describes a two stage process for the preparation of fortified, surfactant-free polymer emulsion. The first stage comprises the polymerization of a mixture of monomers including carboxylic containing monomers followed by neutralization of the polymer product. In a second stage a mixture of monomers including acrylate monomers and a polymerization catalyst are added to the emulsion produced in the first stage. No cosurfactant is utilized and the process does not teach the incorporation of high concentrations of wax.

U.S. Pat. No. 4,820,762 describes the preparation of a fortified latex composed of a preformed soluble resin, a cosurfactant and latex forming monomers. The soluble resin is dispersed in water or alkali and comprises a resin having a low molecular weight. The process does not teach the incorporation of high wax concentration in a fortified latex.

U.S. Pat. No. 4,293,471 teaches the production of a fortified emulsion polymer by first preparing an aqueous dispersion of an alkyd resin neutralized to a pH of about and then forming an emulsion polymer from one or more vinyl monomers in aqueous dispersion. The patent does not teach the production of high wax content emulsions.

U.S. Pat. No. 4,569,896 teaches the production of a toner composition which includes resin particles of styrene methacrylate copolymer grafted or containing a low molecular weight wax plus a second resin composed of a terpolymer of styrene, acrylate and acrylonitrile. The developer also contains magnetite particles and carbon black.

Japanese Patent JP 59,191,706 (CA vol. 102:62720t) teaches styrene grafted polyolefin waxes useful as release agents for molded plastics. The polymers are prepared by melt polymerization. The patent does not teach the preparation of fortified emulsions for moisture barrier coatings.

It is an object of the present invention to provide a process for the production of a stable vinyl latex that contains a high concentration of wax and is suitable for the formation of coatings that exhibit superior moisture barrier properties.

Another object of the present invention is the preparation of high wax content aqueous emulsions by the emulsion polymerization of vinyl monomers in the presence of a soluble resin cosurfactant containing said wax.

Yet another object of the present invention is the production of a high wax content soluble resin useful as a cosurfactant in aqueous emulsion polymerization wherein the soluble resin is prepared in the presence of wax under graft polymerization conditions.

SUMMARY OF THE INVENTION

A method has been discovered for the preparation of stable, compatible, resin fortified aqueous vinyl polymer emulsions that are rich in wax. The method involves two consecutive polymerization steps comprising a first polymerization of a mixture containing wax and monomers that include carboxylated monomers such as acrylic acid. The first polymerization or copolymerization is carried out under conditions sufficient to produce a relatively low molecular weight resin. All or at least a portion of the wax rich resin from the first polymerization, after neutralization of a major portion of the carboxylic acid moieties in the resin, is used as a cosurfactant in a second aqueous emulsion polymerization of vinyl monomers to produce a fortified vinyl latex that is rich in wax. Coatings prepared from the latex exhibit superior moisture barrier properties and are also useful as surface preservatives.

The process of the invention more specifically comprises a process for the production of a stable, wax-rich aqueous emulsion of vinyl polymers by a first step comprising copolymerizing under addition copolymerization conditions a wax-rich mixture comprising vinyl monomers containing at least one carboxylated vinyl monomer in contact with a free radical initiator. The resin or copolymerization product produced comprises a carboxylated vinyl copolymer resin rich in wax. A major portion of the copolymer is treated with ammonium hydroxide or aqueous alkali to produce an alkaline aqueous copolymerization product. In a second step, at least a portion of the alkaline aqueous copolymerization product is introduced into an aqueous emulsion polymerization mixture containing at least one vinyl monomer and a cosurfactant in contact with a free radical initiator under addition polymerization conditions whereby a stable, wax-rich aqueous emulsion is produced, referred to herein as a fortified latex.

A preferred embodiment of the invention comprises a process for the production of a stable, paraffin wax-rich vinyl latex useful in the production of coatings having low moisture permeability. The process includes two sequential steps comprising a first copolymerization step involving copolymerizing in an organic solvent under addition copolymerization conditions, for a time sufficient to produce a paraffin wax-rich copolymer product. The first step copolymerization mixture contains 32–33 wt. % of solvent, 10–30 wt. % of a paraffinic wax and 37–58 wt. % of a mixture of at least three vinyl monomers having a combined acid number between 150 and 250 and selected from vinyl monomers capable of providing homopolymers that exhibit glass transition temperatures greater than 70° C., plus about 10 wt. % (based on monomer) of a free radical initiator. The first step reaction mixture product is distilled to recover the copolymer product and the copolymer product is treated with aqueous alkali in an amount sufficient to provide an aqueous paraffin wax-rich copolymer product having a pH between 7.5 and 9.5.

All or a portion of the foregoing first step aqueous copolymer product is introduced into a second step aqueous latex emulsion copolymerization mixture under emulsion copolymerization conditions. The amounts of the latex reagents, including the first step product, are chosen so as to provide a final latex non-volatile solids composition of 45–75 wt. %, preferably 60–70 wt. %, of at least two vinyl comonomers, one of which comonomer comprises stearyl methacrylate; 2–10 wt. %, preferably 4–6 wt. %, of nonionic surfactant; 3–20 wt. %, preferably 7–10 wt. %, of wax from step one; and 20–50 wt. %, preferably 26–38 wt. %, of resin from step one. The copolymerization product comprises a stable, paraffin wax-rich vinyl latex.

DETAILED DESCRIPTION OF THE INVENTION

Two distinct polymerization reactions are carried out sequentially to produce the stable, wax-rich, fortified vinyl latex that satisfies a primary objective of the invention. The first is a polymerization process to produce a wax enriched, low molecular weight, water soluble resin; the second is an aqueous emulsion polymerization process that uses the soluble resin as a surfactant or cosurfactant to produce the stable, wax-rich fortified vinyl latex. As to the useful methods of polymerization, obviously the second polymerization is limited to methods known in the art for aqueous emulsion addition polymerization of vinyl monomers to form a latex, preferably by free radical initiation or catalysis. The first polymerization, however, in not so constrained. The production of a soluble resin rich in wax can be carried out by any of a variety of methods or mechanisms including ionic catalysis, coordination catalyst or free radical initiated addition polymerization, polycondensation, cyclopolymerization and the like. The first polymerization may be carried out in bulk, as by melt or neat polymerization, in solution, or in aqueous or organic emulsion. Preferably, the first polymerization is carried out in solution in an organic solvent.

The polymerization method to be used to prepare the wax-rich soluble resin is dictated largely by the selection of monomers to be polymerized or copolymerized, the desired molecular weight range and the type of wax to be incorporated in the soluble resin. Although not intending to be bound by theoretical considerations, the inclusion of a high concentration of wax in the soluble resins prepared by the process of the instant invention is believed to occur, in part, by graft polymerization of wax molecules onto the resin backbone as that backbone is formed during the course of polymerization. This event, wax grafting, tends to enhance the compatibility of the resin and non-grafted wax such that the carrying ability of the soluble resin for wax, i.e., the ability of the soluble resin to maintain a homogeneous mixture, is substantially increased.

In view of the foregoing theoretical considerations, the selection of monomers and polymerization methods useful for the preparation of soluble resins in the instant invention is restrained to those monomers and methods conducive to the formation of copolymers containing or carrying wax and/or having wax molecules grafted onto the resin backbone that can still be used effectively as a surfactant or cosurfactant in the subsequent vinyl emulsion polymerization step. It has been discovered that the judicious selection of monomers and methods for the production of soluble resins can lead to a substantial increase in the wax carrying capabilities of these resins and a subsequent increase in the stability of the wax containing aqueous emulsions or latices prepared using the soluble resins of the invention. Monomers and methods employed in the production of the soluble resin of the invention are particularly taken from those that produce vinyl polymers and/or alkyds having free carboxylic acid groups, described herein as carboxylated polymers or resins. For vinyl monomers, the preferred method for the production of the vinyl copolymers comprising the soluble resin is free radical initiated polymerization in solution.

PREPARATION OF SOLUBLE RESIN

Monomers for the first copolymerization step are selected to produce a low molecular weight, water soluble resin of low crystallinity and high glass transition temperature ($T_g$). Water solubility of the resin is necessary to permit the resin to function as a surfactant or cosurfactant in the subsequent aqueous emulsion polymerization and can be achieved by including an ethylenically unsaturated acid functional comonomer in the resin polymerization or an ethylenically unsaturated comonomer containing a water soluble polyether moiety.

Preferably, monomers suitable for the first polymerization preparation of a soluble resin include at least one monomer having an acid moiety or functionality in an amount sufficient to provide a soluble resin having an acid number of 150–250, based on total monomer weight. Acid functional monomers include acrylic acid (preferred), methacrylic acid, maleic acid or anhydride, half esters of maleic anhydride and the like. At least two other ethylenically unsaturated monomers are included in the first polymerization. Such monomers include styrene, α-methylstyrene, para-methylstyrene, para-chlorostyrene, vinylnaphthalene, vinyl toluene, vinyl halides such as vinyl chloride, and acrylonitrile; vinyl esters including vinyl acetate, vinyl propionate, vinyl benzoate and the like; vinyl ethers such as vinyl methyl ether, vinyl isobutyl ether, vinyl ethyl ether, and the like; vinyl ketones, vinylidene halides and N-vinyl pyrrolidone; acrylamide and $C_1$ to $C_{18}$ linear and branched esters of acrylic acid and methacrylic acid, particularly isobutyl methacrylate. The monomers are preferably selected so as to provide a soluble resin copolymer or terpolymer having a glass transition temperature of 70°–80° C., as calculated by the Fox equation.

The most preferred mixture of monomers to produce the preferred terpolymer soluble resin of the invention comprises acrylic acid, styrene and isobutyl methacrylate in a weight ratio of about 1:1.23:1.61.

Preferably, the selected monomers are dissolved in an organic solvent and the polymerization is carried out by free radical initiated solution polymerization. However, it is within the scope of the invention to carry out the polymerization to produce the soluble resin by free radical initiated bulk polymerization or aqueous emulsion polymerization. Useful solvents for the first polymerization include 4-methyl-2-pentanone, butyl acetate, propylacetate, 2-butanone, 2-heptanone, or mixtures thereof. MIBK or butyl acetate are most preferred.

Free radical initiators useful for the preparation of soluble resin comprise any peroxyester or peroxyacid soluble in the selected system. For solution polymerization, tert-butyl peroctoate is preferred. Others that could be used include benzoyl peroxide, t-butyl peroxyisobutyrate, t-butyl peroxyacetate, di-t-butylperoxide, t-butyl peroxybenzoate and azo-bisisobutyronitrile. Preferably, a relatively high concentration of initiator is used in the soluble resin polymerization step in order to produce a resin having a low molecular weight between about 1000 and 12,000, but preferably between about 4,000 and 8,000. The preferred molecular weight range can be achieved by using 8–10 wt. % of initiator, based on the total weight of monomers.

A key element of the instant invention is the discovery that stable fortified vinyl latices rich in wax can be prepared when the fortifying soluble resin that is added to the vinyl latex polymerization step is prepared in the presence of wax. While the wax concentration in the soluble resin polymerization reaction can be 10–60 wt. % based on solvent, the preferred range is 24–48 wt. %, with a most preferred wax content of about 37 wt. %.

While a wide range of waxes can be used to achieve the objective of the instant invention, the preferred wax is a neutral paraffin wax, Rosswax 145, which has a melting point of 51°–93° C., a flash point of 204°–243° C., a specific gravity at 25° C. of 0.88–0.92 and a molecular weight of about 500. Neutral paraffin wax is produced from petroleum from the neutral distillate overhead taken during crude refining and is predominantly a straight chain hydrocarbon.

Waxes, their definition and properties, are described in the Encyclopedia of Polymer Science and Technology, 1971, 14, pp 768–778, and in an article in the J. Oil & Colour Chem. Assoc. 1989, 72(8), pp 297,300 and 312 to which reference is made for a more detailed description of waxes useful in the instant invention. Waxes useful in invention are classified as natural, modified natural or synthetic waxes. Natural waxes include Beeswax and Carnauba wax. Modified waxes, derived from fossil fuels, include paraffin wax, microcrystalline wax and montan wax. Synthetic wax includes polyethylene wax, oxidized polyethylene wax and Fisher Tropsch Amide Wax.

The soluble resin polymerization mixture is typically prepared to contain 10–30 wt. % wax, 32–33 wt. % solvent and 37–58 wt. % of a mixture of monomers. Initiator is added at about 10 wt. %, based on monomer weight and the mixture heated for a time sufficient to complete the copolymerization, i.e., about 4–5 hours. Solvent is removed by evaporation or distillation and the residue is treated with aqueous alkali such as ammonium hydroxide or aqueous potassium hydroxide to neutralize 85–100 mol % of the carboxylic acid present in the resin. The aqueous product preferably contains about 30 wt. % of soluble resin and wax and preferably has a pH of 8.0–8.5. Non-volatiles comprise about 15–45 wt. % wax and 85–55 wt. % of copolymer or terpolymer.

PREPARATION OF WAX-RICH FORTIFIED VINYL LATEX

The second copolymerization is carried out basically according to aqueous emulsion polymerization methods well known for the production of vinyl latices. However, the method departs from known art in that a high wax content soluble resin is added as surfactant or co-surfactant and the comonomers are selected from those that will provide a calculated $T_g$ of 50°–90° C., preferably 70°–85° C. The second copolymerization step of the process can be carried out in the same reaction vessel employed for the preparation of the soluble resin or an alternate vessel can be used with soluble resin added to the copolymerization process. In one embodiment, the soluble resin product is diluted with additional water in the reaction vessel and the aqueous emulsion polymerization carried out in the same vessel that contains all the soluble resin product.

Monomers useful in the preparation of the fortified vinyl latex include styrene, α-methylstyrene, para-methylstyrene, para-chlorostyrene, vinylnaphthalene, vinyltoluene, vinyl halides such as vinyl chloride, and acrylonitrile; vinyl esters including vinyl acetate, vinyl propionate, vinyl benzoate and the like; vinyl ethers such as vinyl methyl ether, vinyl isobutyl ether, vinyl ethyl ether, and the like; vinyl ketones, vinylidene halides and N-vinyl pyrrolidone; acrylamide and $C_1$ to $C_{18}$ linear and branched esters of acrylic acid and methacrylic acid. Stearyl methacrylate is a particularly preferred comonomer for the production of vinyl latex. A particularly preferred comonomer pair is 70 wt. % styrene and 30 wt. % stearyl methacrylate.

In the instant invention, the soluble resin acts as surfactant for the vinyl monomer emulsion copolymerization. However a small amount of a cosurfactant can be added to enhance latex stability, reduce grit and foaming. A preferred cosurfactant is Igepal CO-977 (GAF Corp.). Other useful cosurfactants include Pluronic L-61 (BASF Corp.), Surfynol-104 and Surfynol-465 (Air Products and Chemicals, Inc.).

As free radical initiator for the vinyl polymerization, any water soluble initiator can be used with ammonium persulfate preferred.

The emulsion polymerization is carried out preferably at 20°–100° C., but most preferably at about 82° C. The amounts of reagents are chosen so as to give a final preferred non-volatile solids composition of 40–45 wt. % and containing 3–20 wt. wax. The remainder of the solids, i.e. 80–93 wt. %, is composed of 20–50 wt. % soluble resin from the first polymerization, but preferably 26–38 wt. %; 2–10 wt. % cosurfactant, but preferably 4–6 wt. %; and 45–75 wt. % latex-forming vinyl monomers, but preferably 60–75 wt. %.

The final latex product from a preferred aqueous emulsion polymerization contains about 41 wt. % total nonvolatile solids with an acid number of about 50. The Brookfield viscosity of the emulsion, measured at 25° C. and 20 RPM is 3–20 poises. The non-volatile composition is 9 wt. % wax and 91 wt. % non-wax solids. The non-wax solids consist of about 28 wt. % of a soluble resin of acrylic acid, styrene and isobutyl methacrylate, 5 wt. % of Pluronic L-61 and a vinyl copolymer comprising 47 wt. % styrene and 20 wt. % stearyl methacrylate.

Employing in sequence the foregoing methods for step 1, i.e. the preparation of the wax-rich soluble resin, and step 2, i.e. the preparation of the wax-rich resin fortified latex, a variety of wax enriched fortified laticies can be produced containing relatively low to relatively high wax concentrations. Generic examples of the process provided to illustrate the range of the invention are presented as Example A (low wax), Example B (intermediate wax) and Example C (high wax). Parts are expressed in parts by weight.

Example A (Low Wax)

The first step copolymerization is carried in a mixture containing 15.8 parts of wax and 84.2 parts of comonomers comprising 26 parts of acrylic acid (AA), 32 parts of styrene (S) and 42 parts of isobutyl methacrylate (IBMA) plus 10 wt. % of initiator, based on monomers. The second step fortified latex is prepared by emulsion polymerization of a mixture containing 32.6 parts of the foregoing copolymerization product, 4.7 parts of a surfactant and 63.7 parts of monomers comprising 70 parts of styrene and 30 parts of stearyl methacrylate. On a solids basis, the stable, fortified latex product contains 5 parts of wax and 95 parts of a mixture consisting of 5 parts of a surfactant, 28 parts of the polymeric residue from the polymerization of step 1 monomers and 67 parts of the polymeric residue from the polymerization of step 2 monomers.

Example B (Intermediate Wax)

A preferred wax rich resin fortified latex is prepare as follows:

The first step copolymerization is carried in a mixture containing 26.1 parts of wax and 73.9 parts of comonomers comprising 26 parts of acrylic acid (AA), 32 parts of styrene (S) and 42 parts of isobutyl methacrylate (IBMA) plus 10 wt. % of initiator, based on monomers. The second step fortified latex is prepared by emulsion polymerization of a mixture containing 34.5 parts of the foregoing copolymerization product, 4.5 parts of a surfactant and 61 parts of monomers comprising 70 parts of styrene and 30 parts of stearyl methacrylate. On a solids basis, the stable, fortified latex product contains 9 parts of wax and 91 parts of a mixture consisting of 5 parts of surfactant, 28 parts of the polymeric residue from the polymerization of step 1 monomers and 67 parts of the polymeric residue from the polymerization of step 2 monomers.

Example C (High Wax)

For a high wax content product the first step copolymerization is carried in a mixture containing 47.2 parts of wax and 52.8 parts of comonomers comprising 26 parts of acrylic acid (AA), 32 parts of styrene (S) and 42 parts of isobutyl methacrylate (IBMA) plus 10 wt. % of initiator, based on monomers. The second step fortified latex is prepared by emulsion polymerization of a mixture containing 42.4 parts of the foregoing copolymerization product, 4.0 parts of a surfactant and 53.6 parts of monomers comprising 70 parts of styrene and 30 parts of stearyl methacrylate. On a solids basis, the stable, fortified latex product contains 5 parts of wax and 95 parts of a mixture consisting of 5 parts of surfactant, 28 parts of the polymeric residue from the polymerization of step 1 monomers and 67 parts of the polymeric residue from the polymerization of step 2 monomers.

The following specific Examples 1, 5, 8 and 10 are presented herein to illustrate the process of the invention and the properties of the fortified latex product of the invention. Examples 2, 4, 7 and 9 are presented to provide comparisons with methods to prepare wax containing fortified latices and properties of those latices wherein the wax is added at some point subsequent to the preparation of the soluble resin. Examples 3 and 6 contain no wax. In all Examples where a wax was included (Examples 1, 2, 4, 5, 7, 8, 9 and 10), the wax was a neutral paraffin wax (Rosswax 145). The latex prepared in Examples 1–4 comprised an acrylic acid/styrene/isobutyl methacrylate soluble resin and a 70/30 styrene/stearyl methacrylate latex. Examples 5–7 comprised an acrylic acid/vinyl toluene/isobutyl methacrylate soluble resin and a 30/70 vinyl toluene/stearyl methacrylate latex. Examples 8–9 comprised an acrylic acid/vinyl toluene/isobutyl methacrylate soluble resin and a 70/30 vinyl toluene/stearyl methacrylate latex. Example 10 is identical to Example 1, with the exception that the soluble resin was neutralized with sodium hydroxide instead of ammonia. The results of the Examples show clearly that the product of the invention provides superior moisture barrier properties. The results of Examples 1–10 are summarized in Table 1. The moisture vapor transmission rate (MVTR) values reported in Table 1 and in the Examples were obtained after dilution of the corresponding reaction product with water to a viscosity of 20–25 sec Zahn cup number 2 and application with a number 5 Meyer Rod to the substrate.

Unless otherwise indicated, component parts of the Examples 1–10 are expressed in parts by weight.

TABLE 1

| EX. NO. | PROCESS SUMMARY | | MVTR[1] |
|---|---|---|---|
| 1 | (SR)[2,3] | 9% wax[4] + AA/S/IBMA | 0.4 |
|   | (latex) | S/SMA | |
| 2 | (SR) | AA/S/IBMA | Coagulum and grit |
|   | (latex) | 9% wax[5] + S/SMA | |
| 3 | (SR) | AA/S/IBMA | 3.0 |
|   |   | S/SMA | |
| 4 | (SR) | AA/S/IBMA | 2.5 |
|   | (latex) | S/SMA + 9% wax[6] | |
| 5 | (SR) | 17% wax + AA/VT/IBMA | 0.6 |
|   | (latex) | VT/SMA | |
| 6 | (SR) | AA/VT/IBMA | 2.5 |
|   | (latex) | VT/SMA | |
| 7 | (SR) | AA/VT/IBMA | 4.0 |
|   | (latex) | VT/SMA + 17% wax[6] | |
| 8 | (SR) | 9% wax + AA/VT/IBMA | 0.4 |
|   | (latex) | VT/SMA | |
| 9 | (SR) | AA/VT/IBMA | 0.7 |
|   | (latex) | 9% wax[5] + VT/SMA | |
| 10 | (SR)[2,7] | 9% wax + AA/S/IBMA | 0.4 |
|   | (latex) | S/SMA | |

[1]MVTR - moisture vapor transmission rate, g/100 sq. in./day, measured by Permatram W-1A Water Vapor Transmission Rate Tester according to ASTM F1249-89.
[2]soluble resin
[3]neutralization with aqueous 28% ammonia.
[4]weight percent of non-volatile portion in final latex.
[5]Wax added prior to latex formation.
[6]Wax added to pre-formed latex.
[7]Neutralization with aqueous sodium hydroxide.

EXAMPLE 1

Step 1: Preparation of Wax/Soluble Resin Dispersion

A stirred flask was charged with 47.5 parts of methyl isobutyl ketone (MIBK) and 28.0 parts of Rosswax 45 (Frank B. Ross Co.). The mixture was heated to reflux temperatures, at which point a clear solution was formed. Over a 4-hour period, a solution of 20.0 parts acrylic acid, 25.2 parts styrene, 32.8 parts iso- butyl methacrylate, 8.0 parts t-butyl peroctoate and 8.0 parts MIBK was added at a constant rate. The batch was maintained at reflux temperatures throughout the addition period (120°–126° C.). After the addition, a further portion of 0.5 parts t-butyl peroctoate in 2.5 parts MIBK was added, and the reaction mixture was kept at reflux temperature for an additional 4-hour period. The apparatus was then fitted for azeotropic distillation, and MIBK solvent was removed until a batch temperature of 135° C. was reached. The batch was then allowed to cool below 100° C. then a solution of 24 0 parts of aqueous ammonia solution (28%) in 223.0 parts of deionized water was added gradually under vigorous stirring. After reheating to azeotropic distillation temperatures, the top-layer of distilled MIBK was removed and the bottom layer of water was returned to the reaction vessel. Upon reaching 100° C. the batch was maintained at that temperature for 30 minutes; then it was allowed to cool to 45° C. and discharged to give 347.7 parts of colorless dispersion, having a solids content of 30.0%, a pH of 8.86, an acid value of 144.0, and a Brookfield viscosity, at 25° C., of 203 poises (spindle No. 6, at 20 rpm).

Step 2: Wax/Fortified Latex Dispersion

A stirred flask was charged with 165.0 parts of the product from step-1, 6.5 parts Pluronic L-61 (BASF Corp.), 0.7 parts sodium bicarbonate, and 64.9 parts deionized water. The mixture was heated to 80° C. under a nitrogen blanket, and a solution of 0.7 parts ammonium persulfate in 11.4 parts water was added, followed by the addition, at a constant rate over a 4-hour period, of a solution of 61.2 parts styrene and 26.1 parts stearyl methacrylate. The reaction temperature was maintained at 80°±2° C. throughout the addition. Thirty minutes thereafter, a solution of 0.6 parts ammonium persulfate in 5.7 parts water was added, and the reaction mixture was maintained at 80°±2° C. for an additional 3-hour period. The mixture was cooled to 45° C. and filtered through a 150μ mesh nylon cloth to give 339.4 parts of colorless emulsion having a solids content of 42.61%, a pH of 8.05, and a Brookfield viscosity, at 25° C. of 21 poises (Spindle No. 3, 20 rpm). A drawdown of this product on a glass plate gave a clear, glossy, and tack-free film. Moisture barrier properties were 0.4 g/100 sq. in./day.

EXAMPLE 2 (COMPARATIVE)

The soluble resin was prepared from 77.2 parts acrylic acid, 95.8 parts styrene, 127.2 parts isobutyl methacrylate and 30 parts t-butyl peroctoate in 160 parts MIBK, followed by solvent interchange with a solution of 90 parts aqueous ammonia (28%) in 660 parts deionized water, as described in Example 1, part 1. The product, 1034.2 parts, had a solids content of 29.70%, a pH of 8.72, an acid value of 211 (based on solids content) and a Brookfield viscosity of 808 poises (spindle no. 7, 20 rpm). To 122.2 parts of this material were added 6.5 parts Pluronic L-61 (BASF Corp.), 0.7 parts sodium bicarbonate, 97.0 parts deionized water and 13.7 parts Rosswax-145. The mixture was then treated successively with a solution of 0.65 parts ammonium persulfate in 10.0 parts water, then with a mixture of 61.0 parts styrene and 26.1 parts stearyl methacrylate, followed with a solution 0.5 parts ammonium persulfate in 5.0 parts water, as described in Example 1, step 2. After completion of the reaction, filtration of this product gave 339.8 parts of colorless emulsion having a solids content of 41.15%, a pH of 8.03 and a Brookfield viscosity, at 25° C. of 14 poises (Spindle No 2, 20 rpm.). The air-dried residue from the filtration of this material amounted to 10.0 parts of wax and coagulum.

EXAMPLE 3 (COMPARATIVE)

To a stirred portion of 471.0 parts of the aqueous ammoniacal solution of the acrylic acid-styrene/isobutyl methacrylate copolymer described in Comparative Example 2 were added 25.0 parts Pluronic L-61 (BASF Corp.), 3.0 parts sodium bicarbonate, and 230.0 parts deionized water. The reaction mixture was treated with a solution of 3.0 parts ammonium persulfate in 25.0 parts water, followed by a mixture of 235.0 parts styrene and 100.0 parts stearyl methacrylate as described in the preceding examples. Filtration of this wax-free latex gave virtually no residue and gave 1113.6 parts of colorless latex having a solids content of 45.11%, a pH of 8.29, and a Brookfield viscosity, at 25° C., of 32 poises (Spindle No. 4, 20 rpm.). Moisture barrier properties of this product: 3.0 g/100 sq. in./day.

EXAMPLE 4 (COMPARATIVE)

A portion of 200.0 parts of wax-free fortified latex, prepared as described in Comparative Example 3, having a solids content of 52.55% and a pH of 8.69, was stirred and heated to 80° C.; then 10.4 parts Rosswax-145 were added portion-wise, followed by the slow addition of 61.5 parts deionized water, while maintaining the reaction temperature at 80°±2°; then cooled to 45° C. and filtered through a 150μ mesh nylon cloth to give 271.3 parts of colorless emulsion having a solids content of 42.10%, a pH of 8.56, and a Brookfield viscosity of 0.6 poise at 25° C. using a No. 2 spindle at 20 rpm. Moisture barrier properties of this product: 2.5 g/100 sq. in./day.

EXAMPLE 5

Step 1: Preparation of Wax/Soluble Resin Dispersion

The reaction vessel was charged with 30.0 parts MIBK and 28.0 parts Rosswax 145. While stirred, the mixture was heated to reflux temperatures (118° C.). A mixture of 10.0 parts acrylic acid, 12.6 parts vinyltoluene, 16.4 parts isobutyl methacrylate, 4.0 parts t-butyl peroctoate and 5.0 parts MIBK was added to the clear solution at a constant rate over a 3.5-4.0 hour period, while the reaction mixture was maintained at reflux temperature (120°-123° C.). One half hour after the addition, a further portion of 0.5 part t-butyl peroctoate in 2.5 parts MIBK was added, and the reaction mixture was maintained at reflux for an additional 3.5 hour period. The vessel was then fitted for azeotropic distillation and MIBK solvent was removed until a batch temperature of 135° C. was reached. After cooling to below 100° C., a mixture of 12.0 parts 28% aqueous ammonia in 144.0 parts deionized water was added under vigorous stirring. After reheating to azeotropic distillation temperatures, MIBK in the upper distillate layer was removed, and the bottom aqueous layer was returned to the reaction mixture. The batch was held at a vapor temperature of 100° C. for 30 minutes then cooled to 45° C. and discharged to give 244.0 parts of colorless dispersion, having a solids content of 29.9%, a pH of 9.11, an acid value of 116 a Brookfield viscosity at 25° C. of 4.6 poises (Spindle No 2, 20 rpm)

Step 2: Wax/Fortified Latex Dispersion

To a stirred flask was charged 161.0 parts of the product from step-1, followed by 5.0 parts Pluronic L-61 (BASF Corp.), 0.5 parts sodium bicarbonate, and 37.6 parts deionized water. The mixture was heated to 80° C. under a nitrogen blanket, and a solution of 0.5 parts ammonium persulfate in 10.0 parts water was added, followed by the addition, at a constant rate over a 4-hour period, of a solution of 47.0 parts stearyl methacrylate and 20.0 parts vinyltoluene. The reaction temperature was maintained at 80°±2° C. for an additional 3-hour period. The mixture was cooled to 45°-50° C. and filtered through a 150μ mesh nylon cloth to give 286.0 parts of colorless emulsion having a solids content of 42.38%, a pH of 8.81, and a Brookfield viscosity, at 25° C. of 32 poises (Spindle No 3, 20 rpm) A film of this material on a glass plate gave a clear, glossy, and tack-free film. Moisture barrier properties: 0.6 g/100 sq.in./day); gloss: 56.6.

EXAMPLE 6 (COMPARATIVE)

A fortified latex, prepared as described in Example 5, steps 1 & 2, except for the omission of Rosswax-145, having a solids content of 45.21%, an acid value of 56, a pH of 8 28 and a Brookfield viscosity, at 25° C. of 77 poises (Spindle No. 5 at 20 rpm), gave a clear, glossy and tack-free film. The moisture barrier properties were 2.5 g/100 sq. in./day.

EXAMPLE 7 (COMPARATIVE)

A portion of 90.0 parts of fortified latex, prepared as described in Example 5, steps 1 & 2, except for the omission of Rosswax 145, having a solids content of 45.41%, a pH of 8 74 and a Brookfield viscosity, at 25° C. of 51 poises (Spindle No. 5, 20 rpm), was heated to 65-70° C. while stirring with a high speed blender. Molten Rosswax 145, 10.0 parts, was slowly added to the stirred mixture. After the wax addition, the mixture was stirred for an additional hour at 65°-70° C. A film cast from the cooled product was found to be hazy and granular. Moisture barrier properties: 4.0 g/100 sq. in./day.

EXAMPLE 8
Step 1: Preparation of Wax/Soluble Resin Dispersion

A mixture of 28.0 parts Rosswax 145 and 47.5 parts MIBK was treated with 20.0 parts acrylic acid, 25.2 parts vinyltoluene, 32.8 parts isobutyl methacrylate, 8.0 parts t-butyl peroctoate and 8.0 parts MIBK as described in Example 5, step-1. The resultant dispersion was neutralized with 24.0 parts aqueous ammonia (28%) in 223.0 parts deionized water to give after MIBK removal, 349.7 parts of colorless dispersion, having a solids content of 29.95%, a pH of 9.13, an acid value of 152 and a Brookfield viscosity of 306 poises (Spindle No.6, 20 rpm).

Step 2: Wax/Fortified Latex Dispersion

A mixture of 165.0 parts of the product from the Example 7, 6.5 parts Pluronic L-61 (BASF Corp.), 0.7 parts sodium bicarbonate, and 64.9 parts deionized water was treated with a mixture of 61.2 parts vinyltoluene and 26.1 parts stearyl methacrylate as described in Example 5, step 2 After filtration at 45° C. 340.0 parts of colorless emulsion were obtained, having a solids content of 42.15%, a pH of 8.34 and a Brookfield viscosity of 30 poises at 25° C. (Spindle No. 3, 20 rpm). A film of this material on a glass plate was clear, glossy, and tack-free. Moisture barrier properties: 0.4 g/100 sq. in./day.

EXAMPLE 9 (COMPARATIVE)

The soluble resin was prepared from 77.2 parts acrylic acid, 95.8 parts styrene, 127.2 parts isobutyl methacrylate and 30 parts t-butyl peroctoate in 160 parts MIBK, followed by solvent interchange with a solution of 90 parts aqueous ammonia (28%) in 660 parts deionized water, as described in Example 1, part 1. The product, 1026.5 parts, had a solids content of 30.35 %, a pH of 8.55 and a Brookfield viscosity of 3800 poises (spindle no. 7, 20 rpm). To 92.3 parts of this material were added 5.0 parts Pluronic L-61 (BASF Corp.), 0.5 part sodium bicarbonate, 84.0 parts deionized water and 13.0 parts Rosswax 145. The mixture was treated with a solution of 47.0 parts vinyltoluene and 20.0 parts stearyl methacrylate as described in Comparative Example 6, to give 276.0 parts of a colorless emulsion having a solids content of 41.04%, a pH of 8.48 and a Brookfield viscosity of 5.0 poises at 25° C. (Spindle No. 3, 20 rpm.). A film of this material on a glass plate was hazy and tack-free. Moisture barrier properties: 0.7 g/100 sq. in./day.

EXAMPLE 10

Step 1: Preparation of Wax/soluble Resin Dispersion

A reaction vessel was charged with 100 parts MIBK and 52 parts Rosswax 145. The mixture was heated to reflux temperatures at which point a clear solution was formed. Over a 4-hour period, a solution of 43.6 parts acrylic acid, 53.8 parts styrene, 70.6 parts isobutyl methacrylate, 16.8 parts t-butyl peroctoate and 20 parts MIBK was added at a constant rate. The batch was then treated as described in Example 1, step 1, and neutralized with a solution of 18.3 parts sodium hydroxide in 394 parts deionized water. The product, 722.6 parts, had a solids content of 31.24 %, a pH of 7.9, a Brookfield viscosity of 80 centipoises (spindle no. 2, 20 rpm) and a residual acid number of 31.

Step 2: Wax/Fortified Latex Dispersion

A reaction vessel was charged with 156.7 parts of the product from step 1, 7.1 parts Pluronic L-61 (BASF Corp.), 0.8 parts sodium bicarbonate, and 104.3 parts deionized water. The mixture was heated to 80° C., and a solution of 0.8 part ammonium persulfate in 10.0 parts deionized water was added, followed by the addition of a mixture of 62.5 parts of styrene and 26.8 parts stearyl methacrylate at a constant rate over a 3-hour period at a reaction temperature range of 80°±2° C. The reaction mixture was then treated as described in Example 1, step 2, to give 372.4 parts of a colorless emulsion having a solids content of 42.3%, a pH of 7.9, an acid value of 14, and a Brookfield viscosity of 84 centipoises (spindle no. 2, 20 rpm). Moisture barrier properties were 0.4 g/100 sq. in./day.

As described herein before, the preferred wax for use in the process of the invention is a neutral paraffin wax such as Rosswax 165. However, other waxes can be used with varying degrees of success when, particularly when they are incorporated into the latex by the method described in Example 1. Examples 11-20 were carried out using various waxes under the graft polymerization and non-graft polymerization conditions depicted in Examples 1-10 and the properties of the resultant latex were measured. The waxes tested and the properties of the resultant product are presented in Table 2.

TABLE 2

| | | WAX[1] | | |
|---|---|---|---|---|
| Exam. | Name | MP °C. | Acid No. | Type |
| 11 | Rosswax 165 | 74 | 0 | paraffin |
| 12 | Paraffin wax 112/118 | 46 | 0 | paraffin |
| 13 | Cardis 320 | 91 | 36 | Oxid. HC. microcry. |
| 14 | Cardis 320 | " | " | " |
| 15 | Petrolite C8500 | 95 | 9 | " |
| 16 | Ceramer-67 | 97 | 48 | Modified HC |
| 17 | Ceramer-67 | " | " | " |
| 18 | Polywax 500 | 88 | 0 | Polyethylene |
| 19 | Vybar 373[2] | 110 | 0 | Fischer Tropsch |
| 20 | Vybar-103[2] | 71 | 0 | Fisher Tropsch |

PRODUCT PROPERTIES

Total % Brook.

TABLE 2-continued

| Exam. | Non-Vol. | Vis. (P) | MVTR[4] | GLOSS[5] |
|---|---|---|---|---|
| 11 | 39 | | | 55 |
| 12 | 42 | 17 | 4.8 | 30 |
| 13 | 40 | 2 | | 50 |
| 14 | | unstable latex | | non-graft[3] |
| 15 | 40 | 19 | 3.3 | 57 |
| 16 | 40 | 100 | 3.5 | 53 |
| 17 | | unstable latex | | non-graft[3] |
| 18 | 38 | 100 | 0.6 | 43 |
| 19 | 41 | 190 | 1.2 | 49 |
| 20 | 45 | 114 | 1.1 | 50 |

[1]All waxes constitute 9-10% of the non-volatile portion of the final latex.
[2]Equal weight mixtures with Rosswax 145.
[3]Wax added after formation of soluble resin, as in comparative Examples 2 and 9.
[4]MVTR - moisture vapor transmission rate, g/100 sq. in./day, measured by Permatram W-1A Water Vapor Transmission Rate Tester, according to ASTM F1249-89.
[5]Determined by BYK Gardner, Inc. Gloss Meter at reflected light of 60° angle.

What is claimed is:

1. A process for the production of a stable, paraffin wax-rich vinyl latex useful in the production of coatings having low moisture permeability comprising the steps of:
   a) copolymerizing in an organic solvent under addition copolymerization conditions for a time sufficient to produce a paraffin wax-rich soluble resin a component mixture comprising: (1) a paraffinic wax and (2) a monomer mixture of at least three vinyl monomers having a combined acid number between 150 and 250 and selected from vinyl monomers capable of providing homopolymers that exhibit glass transition temperatures greater than 70° C., and a free radical initiator;
   b) distilling the copolymerization reaction mixture to recover said soluble resin;
   c) treating the soluble resin with aqueous alkali in an amount sufficient to provide an aqueous paraffin wax-rich soluble resin having a pH above 7.5;
   d) introducing a portion of said aqueous soluble resin into an aqueous emulsion copolymerization component mixture under emulsion copolymerization conditions, said mixture comprising at least two vinyl monomers, one of which monomer comprises stearyl methacrylate, a nonionic surfactant, and a free radical aqueous emulsion polymerization initiator; whereby said stable, paraffin wax-rich vinyl latex is produced.

2. The process of claim 1 wherein the step a) vinyl monomers are selected from the group consisting of acrylic acid, methacrylic acid, styrene, vinyltoluene, α-methylstyrene, vinyl chloride, acrylonitrile, acrylamide, vinyl acetate, esters of acrylic acid, esters of methacrylic acid and stearyl methacrylate.

3. The process of claim 1 wherein said soluble resin contains about 9 wt. % paraffinic wax and comprises a terpolymer of acrylic acid, styrene and isobutyl methacrylate.

4. The process of claim 1 wherein the step d) vinyl monomers are selected from the group consisting of, styrene, vinyltoluene, α-methylstyrene, vinyl chloride, acrylonitrile, acrylamide, vinyl acetate , esters of acrylic acid, esters of methacrylic acid and stearyl methacrylate.

5. The process of claim 1 wherein the step a) component mixture contains 10-30 wt.% said wax and 37-58 wt. % said vinyl monomers; and the step d) component mixture contains 45-75 wt. % of said vinyl monomers, based on total solids.

* * * * *